T. S. CRANE.
LUBRICATING DEVICE FOR SHEARS.
APPLICATION FILED MAR. 19, 1918.
1,303,463.
Patented May 13, 1919.
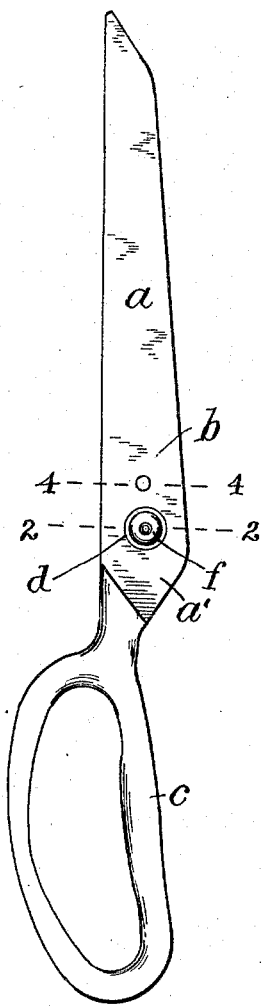
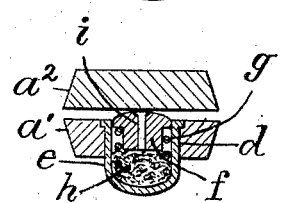
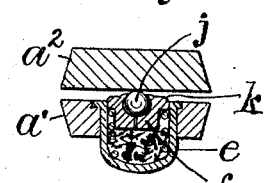
Inventor
Thomas S. Crane.

UNITED STATES PATENT OFFICE.

THOMAS S. CRANE, OF EAST ORANGE, NEW JERSEY, ASSIGNOR, BY MESNE ASSIGNMENTS, TO BISHOP WHITE, OF WEST HARTFORD, CONNECTICUT, AND EDUARD F. VON WETTBERG, OF FAIRFIELD, CONNECTICUT.

LUBRICATING DEVICE FOR SHEARS.

1,303,463. Specification of Letters Patent. Patented May 13, 1919.

Application filed March 19, 1918. Serial No. 223,312.

*To all whom it may concern:*

Be it known that I, THOMAS S. CRANE, a citizen of the United States, residing at 3 University Place, East Orange, county of Essex, and State of New Jersey, have invented certain new and useful Improvements in Lubricating Devices for Shears, fully described and represented in the following specification and the accompanying drawings, forming a part of the same.

This invention consists in an improvement upon G. H. Isbell's scissors or shears for which Patent No. 946,918 was granted to him on January 18, 1910, in which a plug is located movably in one of the shear-blades and a spring fitted beneath the plug to press it elastically toward the opposite blade.

This construction resulted in throwing the edges of the blade together so as to keep the scissors or shears in condition for cutting, but no provision was made for lubricating the spring or the plug, and they were liable to become rusty when used under conditions where the spring and pivot were liable to be moistened and thus exposed to rust.

In my improvement I have provided a socket carried by one of the blades, in which socket is a spring pressed plug and between the plug and the bottom of the socket is an oil pad, the socket being bored to permit ready distribution of the oil. By moving one of the blades relative to the other when the shears are open or partly open, on the pivot pin as a fulcrum and at right angles to the plane of the cutting edge, the plug is alternately pushed in and out of the socket and thereby compresses the oil pad to force out the oil.

Such use of shears is very common in cutting wet objects, as the stems of fresh flowers and other objects which may convey moisture to the tension device, and the present invention furnishes a means of wholly protecting such parts of the shears from rust, which would otherwise produce a deterioration or an impaired condition.

Such injury I prevent by locating an oil-pad within the socket which contains the spring and plug, such pad operating to lubricate the spring and the plug and thus prevent their corrosion. The invention will be understood by reference to the annexed drawing, in which Figure 1 represents the inner side of a shear-blade provided with a tension-plug in a socket; Fig. 2 is a cross section on line 2—2 in Fig. 1; Fig. 3 is a similar cross section showing an anti-friction ball in the plug.

$a$ designates portion of the shear-blade at the upper side of the pivot $b$. $c$ is the handle of the blade, and $a'$ the shank of the blade between the pivot and the handle. A bore $d$ is formed through the blade in the shank $a'$ and a socket $e$ fitted thereto with a plug $f$ movable therein.

A spiral-spring $g$ is shown fitted between the bottom of the socket and a shoulder upon the plug to press the plug normally upon the opposite shank $a^2$, shown in Figs. 2 and 3.

The parts so far described represent the construction heretofore used in which the plug was liable to rust in the socket and the spring to be deteriorated by rust so as to become inoperative.

These evils are corrected in the present invention by means of an oil-pad $h$ fitted in the socket to lubricate the spring and protect it from rust.

This is the primary object of the oil-pad, but the lubricant may also operate to lubricate the bearing-surface of the plug by means of an oil-duct $i$ formed through the length of the plug, and thus adapted to convey the lubricant from the oil-pad to the bearing-surface of the plug which contacts with the opposite shear-blade $a^2$.

The plug and interior of the socket are so lubricated that they are also preserved from rust and are kept in working condition.

Such lubrication may be effected and the friction of the plug against the opposite blade still further reduced by fitting an anti-friction-ball $j$ in a recess $k$ upon the bearing-end of the plug, as shown in Fig. 3.

The oil-duct extends from the bottom of such recess into the chamber containing the oil-pad, and the lubricant is thus enabled to reach the under side of the ball where it is supported in the recess.

As the shears are opened and closed the ball is turned more or less in its recess and its oiled side, by contact with the blade $a^2$, serves to keep the contacting surfaces in a lubricated condition and thus to prevent their rusting.

I hereby disclaim the construction shown in Isbell's Patent No. 946,918, and am aware that my present invention is tributary to his claims.

I therefore claim only my means of lubricating the spring, the plug, and the ball, if one be used, by the introduction of an oil-pad into the socket in which the spring and plug are located.

It will be obvious that whenever one of the shears blades is moved relative to the other on the pivot as a fulcrum and at right angles to the plane of the cutting edge the plug is forced into the socket, compresses the oil pad and squeezes out the oil so that all of the lubricant in the socket can be used.

Having thus set forth the nature of the invention, what is claimed herein is:

1. In a pair of scissors or shears having a tension device applied to the shear members, comprising a spring and plug seated in a socket in one of said members, the end of the plug bearing upon the other member, means to prevent rusting of the tension device, said means comprising an oil pad seated in the socket behind the plug and operating to lubricate the bearing end of the plug.

2. In a pair of scissors or shears having a tension-device applied to the shear-members, consisting of a spring and plug seated in a socket in one of the said members, the end of the plug bearing upon the other member, means to prevent rusting of the tension device and to lubricate the bearing-end of the plug, said means consisting of an oil-pad seated in the socket beneath the plug, the plug having an oil-duct extended through its length and operating to lubricate the bearing-end of the plug.

3. In a pair of scissors or shears, the combination of a socket member carried by one of the blades of the shears, a bored plug in the socket, a spring normally forcing the plug outwardly so as to engage the other shear blade and an oil pad in the socket behind the plug and adapted to be compressed when the plug is forced inwardly to force the oil from the socket.

4. A lubricating device comprising a tubular member adapted for insertion in an apertured or recessed support, said member having an open end and a closed end, a plug movably positioned in the open end of the member and having a portion extended beyond said open end, a spring within the member and engaging both the closed end thereof and the plug whereby said plug is urged outwardly of the open end of the member, means within said member located between the plug and closed end of the member adapted to contain a lubricant whereby the elements of the complete device are lubricated and prevented from rusting, and means to permit the flow of lubricant to the exposed portion of the plug.

In testimony whereof I have hereunto set my hand.

THOMAS S. CRANE.

Copies of this patent may be obtained for five cents each, by addressing the "Commissioner of Patents, Washington, D. C."